//ATTORNEY

United States Patent [19]
Schindler

[11] 3,809,481
[45] May 7, 1974

[54] SINGLE REFLECTOR INTERFERENCE SPECTROMETER AND DRIVE SYSTEM THEREFOR

[75] Inventor: Rudolf A. Schindler, Sierra Madre, Calif.

[73] Assignee: The United States of America as represented by the Administrator of the National Aeronautics and Space Administration, Washington, D.C.

[22] Filed: Dec. 1, 1972

[21] Appl. No.: 311,234

[52] U.S. Cl............................... 356/106 S, 356/113
[51] Int. Cl. ............................................. G01b 9/02
[58] Field of Search ........................ 356/106–107, 356/108, 109, 110, 112, 113

[56] References Cited
UNITED STATES PATENTS
3,535,024 10/1970 Webb................................ 356/106
3,458,259 7/1969 Bagley et al. ........................ 356/106

Primary Examiner—Ronald L. Wibert
Assistant Examiner—Conrad Clark
Attorney, Agent, or Firm—Monte F. Mott; John R. Manning; Paul F. McCaul

[57] ABSTRACT

In a Fourier interference spectrometer of the double-pass retroreflector type, a single mirror is employed in the path of both split beams of an incoming ray to cause them to double back through separate retroreflectors. Changes in optical path length are achieved by linear displacement of both retroreflectors using a motor driven lead screw on one for large, low-frequency changes, a moving-coil actuator on the other for smaller, mid-frequency changes and a piezoelectric actuator on one of these two for small, high-frequency changes.

13 Claims, 4 Drawing Figures

SINGLE REFLECTOR INTERFERENCE SPECTROMETER AND DRIVE SYSTEM THEREFOR

ORIGIN OF THE INVENTION

The invention described herein was made in the performance of work under a NASA contract and is subject to provisions of section 305 of the National Aeronautics and Space Act of 1958, public law 85–568 (72 Stat. 435; 42 USC 2457).

BACKGROUND OF THE INVENTION

This invention relates to interferometers and, more particularly, to interferometers utilizing double-pass retroreflectors.

Interferometers are widely used to measure distance with great accuracy (within a fraction of the wavelengths of an incoming ray) or to measure the wavelength of an incoming ray with great accuracy. Although there are now many different types of interferometers, they all follow the basic principles of the Michaelson interferometer in which a beam of light from a source is split into two parts, each of which traverses different optical paths to separate mirrors and which are subsequently reunited to produce interference. One of the mirrors is mounted on a micrometer screw so that the path length of one of the split beams can be changed. The phase difference of the reunited beams will produce a series of interference fringes as the one mirror is moved, the distance the mirror is moved between interference fringes being equal to a half wavelength. As noted in United States Letters Pat. No. 3,535,024, proper operation of an interferometer employing two mirrors as in the basic Michaelson interferometer requires that the two mirrors be maintained perpendicular to each other to within approximately a second of arc.

An improved interferometer disclosed in that patent utilizes a beamsplitter formed by two right-angle prisms with their hypotenuse surfaces joined and a coating of semi-reflecting material on one of the joined surfaces. The two plane mirrors necessary for the interferometer of the basic Michaelson type are then conveniently formed on a corner of the beamsplitting cube. To reunite the split beams reflected by the plane mirrors at the corner of the beamsplitting cube, a separate "cat's eye" retroreflector is used for each beam.

The use of a "cubic" beamsplitter to form the two plane mirrors (on adjacent outside surfaces thereof) requires that the hypotenuse of the right-angle prism used for the mirrors have angles with the two surfaces used for the mirrors equal to within 1° of arc. This degree of precision makes fabrication of such a cubical beamsplitter with two-mirrored surfaces very difficult. It would be advantageous to so arrange the optics of a double-pass retroreflector interferometer that a single plane mirror may be employed for returning both beams.

In the improved interferometer disclosed in the aforesaid patent 3,535,024, the "cat's eye" retroreflector is comprised of a large parabolic primary mirror mounted to receive an incident beam parallel to its axis and a small secondary mirror mounted on the axis and facing the primary mirror. A moving-coil actuator is employed to move one of the retroreflectors along the axis of its primary parabolic mirror through a maximum distance of about 1 cm. Due to the mass of the retroreflector, the optical path lengths cannot be changed by the moving-coil actuator at a very high frequency. Accordingly, a piezoelectric actuator is employed to move the small secondary mirror along the axis of the primary mirror at a higher frequency. In that manner, the effective position of the entire retroreflector can be changed, within a more limited range, by moving the secondary mirror in response to high frequency voltages applied to the piezoelectric actuator.

For larger changes in optical path lengths, the entire retroreflector is moved in response to a signal at a lower frequency applied to the moving-coil actuator. However, changes in optical path lengths are limited, as just noted, to about 1 cm. A moving coil actuator designed for larger, low frequency changes would necessarily involve a greater mass, and consequently be unsuitable for the higher frequencies. The problem then is to provide some means for making large changes at low frequency without in any way limiting the ability to make smaller changes at higher frequencies.

SUMMARY OF THE INVENTION

In accordance with the present invention, a cubical or flat plate beamsplitter is employed in a double-pass retroreflector interferometer in which a single plane mirror, such as a surface of a cubic beamsplitter, is employed to return both split beams. A cubic beamsplitter is formed by two right-angle prisms and the single plane mirror is provided on one of the two surfaces of one prism at an acute angle with the hypotenuse surface. Another mirror on the hypotenuse surface of one of the two prisms is provided over a small portion of the hypotenuse surface near one edge of the cube such that the first of two split beams from the beamsplitter incident upon one retroreflector will be reflected by the primary parabolic mirror onto the secondary plane mirror of the retroreflector, and from there back onto the primary mirror to be reflected out of the retroreflector onto the mirror on the hypotenuse surface of the cubis beamsplitter where it is reflected to the plane mirror on the outside surface of the cube. That external surface mirror reflects the first split beam back to the internal hypotenuse surface mirror so that the first split beam thus reflected passes back through the same retroreflector to the beamsplitter where it is combined with the second split beam.

The incoming path for the second split beam is from the beamsplitter through a second retroreflector where it is reflected from its primary parabolic mirror to its secondary plane mirror, from there back to the primary mirror and from the primary mirror to the external plane mirror of the cubic beamsplitter. From that external mirror, the second split beam is reflected back over the same path to the beamsplitter to be recombined with the first split beam.

To permit the second split beam to be transmitted through the hypotenuse of the right-angle prisms without interference by the internal mirror on the hypotenuse of the one prism, the intersection of the optical axes of the two retroreflectors is offset from the plane of the hypotenuse.

A flat plate with a beamsplitting surface on one face and a mirror surface on the other may be employed in place of the cubic beamsplitter and internal mirror. The single mirror required to reflect both split beams is oriented in the same way as in the case of the cubic beamsplitter at 45° from the beamsplitting surface, but it is made on a separate piece of glass or other optically surfaced material. The plate beamsplitter offsets the path of the first split beam. When the rays are directed through the two retroreflectors at the same distance from the center lines of the retroreflectors, the split beams will be offset from each other due to refraction of one through the plate of the beamsplitter and direct reflecion of the other split beam by the mirror surface on the plate of the beamsplitter.

One retroreflector is attached to a motor driven lead screw to achieve relatively large, low-frequency changes in optical path lengths; smaller amplitude mid-frequency changes are obtained by employing a moving-coil actuator having its coil connected to the other retroreflector and a stationary magnetic field. Very small amplitude high-frequency changes are achieved by employing piezoelectric transducers attached to the secondary mirrors of the retroreflectors. The piezoelectric actuator connected to the secondary mirror in the retroreflector attached to the motor-driven lead screw is energized by a high-frequency (500KHz) signal to modulate the optical output (recombined split beams) which is detected and synchronously demodulated to provide an error signal fed to the moving-coil actuator, and to the piezoelectric actuator of the retroreflector connected to the moving-coil actuator. The moving coil actuator is mechanically linked to a feedback signal generating means which provides a signal for a servo mechanism for positioning the other retroreflector through the lead screw.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
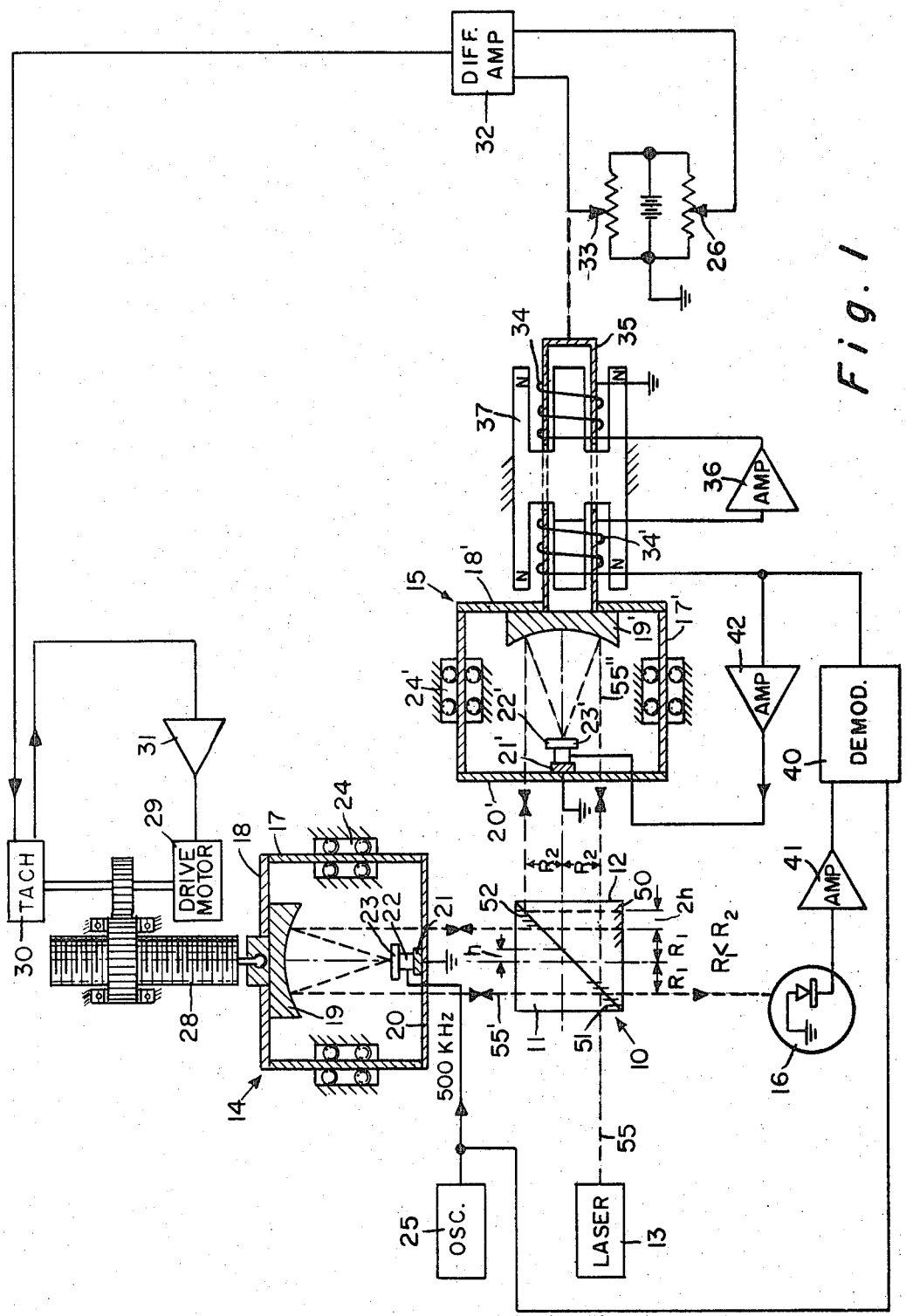
FIG. 1 is a diagram of an interferometer servo system constructed in accordance with the present invention.

FIG. 1 is a schematic diagram of an interferometer servo system constructed in accordance with the present invention. The basic organization and use of such a system is described in the aforementioned U.S. Pat. No. 3,535,024. Briefly, the system can be used to determine the amplitude of radiation components of various optical frequencies with high precision. Such a determination is made by detecting the amplitude of an interference fringe through a photodetector (not shown), and measuring the amplitude for various optical path differences in the interferometer. The components of various frequencies in the radiation are determined by utilizing a Fourier transformation of the output amplitude of the detector versus optical path difference.

Basically, the apparatus comprises a beamsplitter 10 formed by two right-angle prisms 11, 12 with their hypotenuse surfaces joined, and with a semi-reflecting coating on the hypotenuse surface of one prism (at the lower left corner as shown) in order that approximately 50% of radiation from a source 13 of known wavelength be reflected to a first retroreflector 114 while the rest of the radiation is allowed to reach a second retroreflector 15. Light returning from the first retroreflector is passed to a photodetector 16 while light returned from the second retroreflector is reflected to the photodetector 16. In that manner, the retroreflectors return the two split beams to the beamsplitter, and the composite beam resulting from the recombination of the two beams falls on the photodetector 16. The difference in path length for the light beams directed to the retroreflectors 14 and 15 causes the generation of fringes at the plane of the photodetector 16. The photodetector is masked to expose it to only a small portion of one fringe area.

The light from the source 13 is normally projected through the same optical system (not shown) as radiation to be analyzed but is laterally displaced from it by a small distance as described in the aforesaid patent. This causes the recombined beam of a source to be analyzed to fall upon another photodetector not shown. The photodetector 16 which is shown is then a reference photodetector.

Changes in optical path difference, generally due to movement of the retroreflector 15, will cause the fringe areas of maximum amplitude to pass across the reference photodetector 16. The change in path difference between the appearance of fringe maximum is equal to the wavelength of the reference light source 13. A fringe counter (not shown) is then utilized to count the number of fringes passed to determine the precise total optical path difference through which this retroreflector 15 is moved.

This information could be useful, for example, to control a machine tool, or to measure distances exactly, but in an interferometer spectrometer, what is of interest is the total optical path difference for each null point of the output from the other photodetector (not shown). Such is required in order to construct the Fourier transformation of radiation data (called an interferogram) into data which indicates the radiation intensity at each wavelength, as indicated in the aforesaid patent.

Each of the retroreflectors 14 and 15 are of the "cat's eye" type. Since both are identical in construction, only the retroreflector 14 will be described. Corresponding elements of the retroreflector 15 will be indicated by the same, but primed, reference numeral. The retroreflector housing is comprised of a quartz tube 17 having a base portion 18 closing one end. A large parabolic mirror 19 is mounted on that base portion. A rod 20 of invar extends across a diameter of the opened end of the tube out of the path of light. A piezoelectric transducer support 21 of brass or other metal is firmly attached to the rod 20. A piezoelectric transducer 22 is attached to the support 21. A small plane mirror 23 is attached to the other end of the piezoelectric actuator 22 to provide a secondary mirror centered on the axis of the primary parabolic mirror. The transducer support 21 is connected electrically to circuit ground through the rod 20 while the piezoelectric actuator 22 is connected to receive a voltage signal from an oscillator 25 in a manner well known to those skilled in the art to cause constriction and elongation of the piezoelectric actuator along the axis of the primary parabolic mirror in response to that voltage signal. Ball bearings 24 restrain the motion of the lead-screw driven retroreflector to a linear path along the axis of the primary parabolic mirror. The moving-coil driven retroreflector 15 may be similarly restricted to its optical axis by ball-bearings, but flexures are preferred in that instance because use of flexures eliminates bearing "stiction" problems. (Stiction is the deletrious effect of a higher static coefficient of friction than a dynamic friction coefficient.)

To produce an interferogram of the radiation from a source (not shown), the difference in path lengths for the split beams passing through the retroreflectors 14 and 15 is incrementally changed. For example, starting the measurement with the first retroreflector 14 in one position where the path lengths are identical, a difference in path lengths can be increased by moving the retroreflector 15 toward the beamsplitter 10 in response to adjustment of a reference potentiometer 26, thus adjusting the rest position of a moving-coil actuator 27.

In practice, the retroreflector 15 is moved in a large number of steps, each step resulting in an increase of path difference of one wavelength of the beam from the reference source 13. A measurement of the output from the main photodetector (not shown) is then taken for each step. In order to make a measurement within a reasonable time, the effective position of the retroreflector 15 must be changed very rapidly. In addition, rapid control of the effective or relative retroreflector position is required to cancel the effects of any vibrations which may be present in the environment of the spectrometer.

In the present invention, fast optical path length changes are achieved by the linear displacement of three separate elements of the retroreflectors in three frequency and amplitude ranges. Large amplitude, low-frequency changes are achieved through a lead screw 28 driven by a servo motor 29 using a servo loop comprising a feedback tachometer 30 and drive amplifier 31. A position signal for that servo loop is received from a differential amplifier 32 connected to the potentiometer 26 and a feedback means 33, such as a potentiometer as shown or a linear variable differential transformer, which is mechanically linked to the moving-coil actuator 27 comprised of a moving coil 34 attached to a yoke 35 connected to the retroreflector 15. An amplifier 36 feeds the moving coil 34. Connected in series with the input of optical 36 is the moving coil 34' which provides velocity feedback for the moving-coil actuator. A stationary permanent magnet 37 completes the moving-coil actuator. Web portions of the permanent magnet pass through slots in the yoke 35 to position the south pole central arms within the yoke. The slot in the yoke is sufficient for the extent of motion desired from the actuator 27.

The output of the photodetector 16 is delivered to a synchronous demodulator 40 through an amplifier 41. The oscillator 25 provides the demodulating reference signal. The output of the demodulator 40 provides a correction or driving signal to the moving coil 34 and, through an amplifier 42, to the piezoelectric actuator 21' of the retroreflector 15. These driving signals command the movement of the retroreflector 15. In that manner, optical path length changes are achieved in three different frequency and amplitude ranges. The large-amplitude, low-frequency displacements are achieved through the lead screw 29. Smaller amplitude, mid-frequency movements are achieved through the moving-coil actuator attached to the other retroreflector 15, and very small, high-frequency movements are achieved through the piezoelectric transducer 21' attached to the same retroreflector. The advantage of this arrangement is that since the lead screw 29 achieves the larger changes in path length, the moving-coil actuator 27 is required to move less than 1 mm, instead of 1 cm as in the prior arrangement of the aforesaid patent.

To summarize the operation of this improved drive arrangement, before describing an improved double-pass retroreflector arrangement for use in the system, the servo system receives its positional information from the reference potentiometer 26 to change the optical path length difference for the split beams of the reference laser source 13. Fringes varying in amplitude are produced as the optical path difference is changed by the piezoelectric actuator 22 in the retroreflector 14 in response to the 500 KHz signal from the oscillator 25. The interference between the combined split beams is thus modulated at the 500 KHz rate of the oscillator 25. The output of the photodetector 16 is then synchronously demodulated. This modulating technique provides greater DC stability in positioning the retroreflector 15.

In the system of the aforesaid patent, the demodulated error signal is fed to both the moving-coil actuator and to the piezoelectric actuator for the secondary mirror of the retroreflector corresponding to the retroreflector 15 in this improved drive system through a frequency cross-over network. The frequency response of amplifiers 36 and 42 provides the function of the cross-over network to couple low frequency components of the demodulated error signal to the moving-coil actuator and high frequency components to the transducer 22'. In both systems there is also a means (not shown) for unlocking the position loop while incrementing the path lengths difference. Upon changing the optical path difference one fringe position, the servo is then relocked. The lead screw 28 is driven through a servo loop comprising the motor 29, tachometer 30, and drive amplifier 31. The moving coil 34' at the input of the amplifier 36 generates a signal of opposite polarity to the input signal from the demodulator in response to motion produced by current through the moving coil 34 in response to the input signal, thus stabilizing the servo loop. The tachometer 30 operates in a similar manner by producing a signal proportional to the velocity of the lead screw and inserting that signal in opposition to the error signal from the differential amplifier 32. Whenever there is a positional offset of the feedback means, a DC difference signal from the amplifier 32 will actuate the lead-screw servo loop. Consequently, with both retroreflectors moveable, the low-frequency response lead-screw drive can be made to move relatively further in stabilizing the loop, thus allowing the mid-frequency response moving-coil actuator 27 to be of smaller physical size for faster response. Another advantage is allowing use of flexures instead of bearings which eliminates servo-stability problems due to the "stiction" effect.

Referring now to the double-pass retroreflector arrangement of the interferometer, it should be noted that a single external mirror surface 50 on the side of the prism 12 adjacent a beamsplitting mirror 51 is employed to cause both split beams to return through the retroreflectors and beamsplitter. The use of a single external mirror to return both beams eliminates the problem of precisely positioning two separate mirrors as in the arrangement of the aforesaid patent. This is significant because angles formed by the two separate mirrors of the aforesaid patent with the beamsplitting surfaces must be equal to each other to approximately one second of arc. This precision necessarily makes fabrication very difficult if two separate mirrors are employed, particularly when using the more exotic optical materials, such as calcium fluoride, which are used in the infrared region of the spectrum.

In this new configuration of the cubical beamsplitter, the one mirror surface 50 is employed to return both beams while a mirror surface 52 on the hypotenuse surface of the prism 12 is employed to reflect only the split beam passing through the retroreflector 15. FIG. 1 shows the path of a single incoming beam 55. The beam is split into two beams 55' and 55''. The split beam 55' is reflected by the primary parabolic reflector 19 of the retroreflector 14 onto the plane mirror 23 and back to the primary reflector 19. From the primary reflector, the split beam passes through a clear area in the interface between the prisms 11 and 12 to the single external reflecting surface 50. From there the split beam retraces its path through the retroreflector 14 and back through the beamsplitter. Approximately 50 percent of this returning beam is passed by the beamsplitter to the photodetector 16. The second split beam 55'' passes in a similar manner through the retroreflector 15 to the mirror 52 on the hypotenuse surface of the prism 12. The reflecting mirror 52 directs the split beam 55'' onto the single external mirror 50. From there it is reflected back to retrace its path through the retroreflector 15 to the beamsplitting mirror 51. There approximately 50 percent of the split beam 55'' is combined with the returned split beam 55'. Since only one return mirror is used, there is no critical angle difference requirement.

Figure 2:
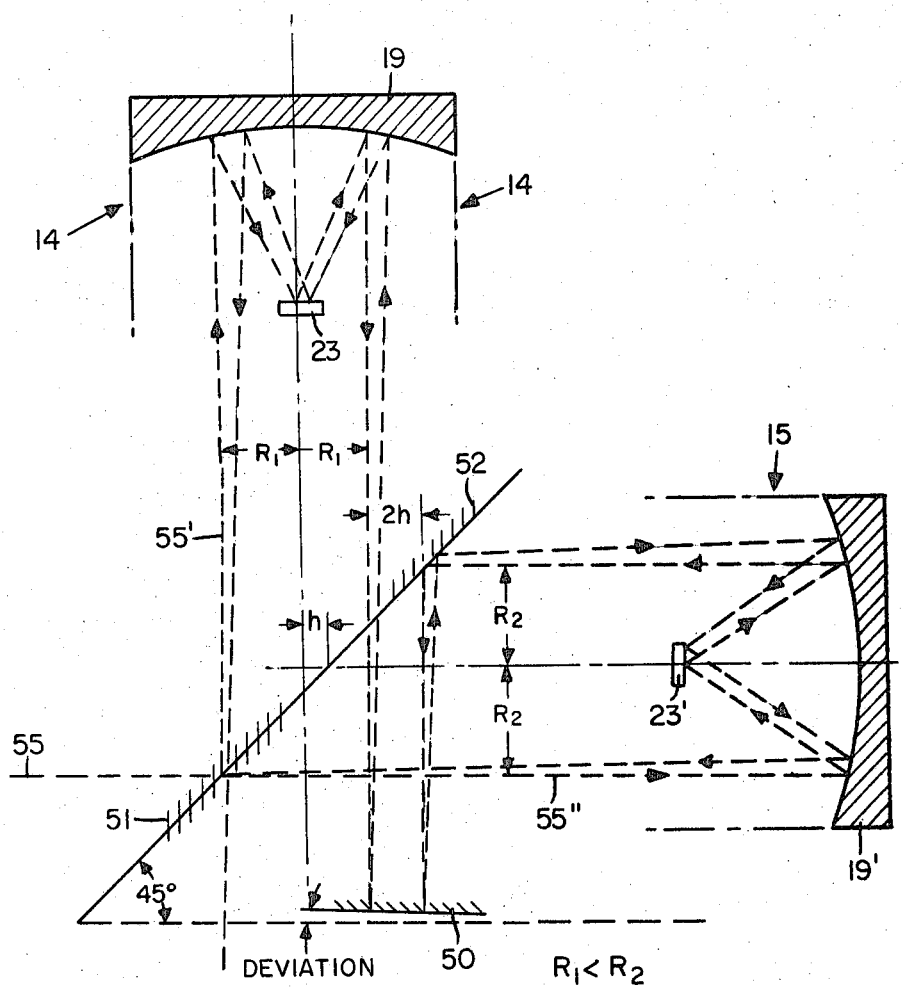
FIG. 2 is an optical diagram demonstrating an important advantage of the present invention.

To better appreciate this advantage consider that the beamsplitter is effectively an infinitely thin plane. The additional optical material of the prisms causes no net differential lateral displacements of the two beams when they recombine. If the beamsplitter is not at an angle of 45° to the incoming ray and/or if the single external mirror is not parallel to the incoming ray, the split beam paths will not retrace through the retroreflectors along precisely the same incoming paths to the single external mirror, but the split beams will nevertheless recombine, as shown in FIG. 2. The limit of offset of the beamsplitter and/or external mirror is determined by the field of view (typically 2° but may be between 1° and 3°) of the cat's eye retroreflectors.

In order to permit the split beam 55' to be transmitted through the hypotenuse of the right-angle prisms without interference by the internal mirror 52 on the hypotenuse of one prism, the intersection of the optical axes of the two cat's eye retroreflectors is offset from the plane of the hypotenuse. In the illustrated embodiment, the offset is to the left on the side of the retroreflector 14, but the offset could be to the right, in which case the mirror 52 would be placed to the left of the split beam 55' passing through the hypotenuse. The physical separation of the two split beams 55' and 55'' going through the hypotenuse is twice the horizontal separation of the centerline from the hypotenuse.

Figure 3:
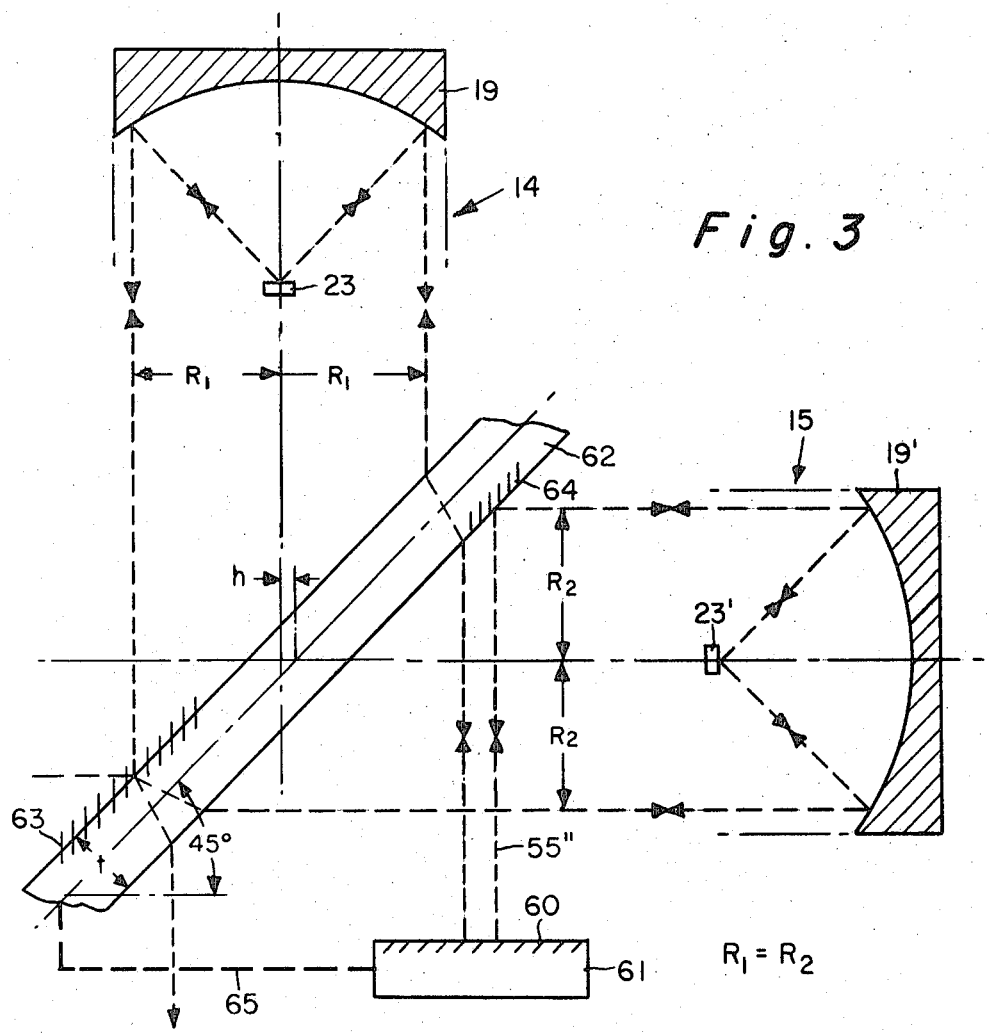
FIG. 3 is a schematic diagram of a second embodiment of the invention.

Referring now to FIG. 3, a second embodiment of this new optical arrangement employing only one return mirror 60 will now be described. That mirror is provided on a plate 61 separate from a flat plate 62 of quartz, or the like, on which the beamsplitting surface 63 is provided. A mirror surface 64 on the side of the flat plate 62 opposite the beamsplitting surface 63 is employed to reflect only the split beam 55''. The plane return mirror 60 is positioned by mechanical means (represented by a dotted line 65) at an angle of 45° from the beamsplitting surface. Again, this angle need not be extremely accurate, just accurate enough to place the return beam within the field of view of each retroreflector. For example, with a field of view of 2°, an error of 10 minutes in the angle would be acceptable. If the optical relationships given by the equation $$h = \sqrt{2}\, t/2 \ \sqrt{2N^2-1}$$

where $t$ and $N$ are the thickness and index of refraction of the plate, respectively, are chosen, it can be seen that the rays go through the two cat's-eye retroreflectors at the same distance from their optical axes, i.e., $R_1=R_2$, yet the rays are separated by a distance $2h$ so that when they hit the hypotenuse surface after going through the cat's-eye on the first pass, one can be reflected by the internal mirror 64 while the other is transmitted through the beamsplitter plate. The advantage of having the rays at the same distance from the optical axes (so that both retroreflectors may have identical primary mirrors) is not possible with the cubic arrangement. However, that is not a requirement as illustrated by a variant in FIG. 4.

Another advantage of this flat-plate double-pass interferometer as compared to the conventional Michaelson interferometer is that it is inherently self-compensating. In a Michaelson interferometer, if one wants to look at different wavelengths (not just one wavelength), a second compensation plate must be used which has the same thickness as the beamsplitter plate in order that the rays in either arm of the interferometer travel through equal thickness of the optical material. If the index of refraction of the material were a constant for all wavelengths, going through different thicknesses of material, this would present no problem; it would be an offset of a constant optical path difference which could be made up with the moving mirror. However, since the index of refraction is not a constant, there is a dispersion of the optical path-difference offsets — they are different for each wavelength. If there is an equal amount of material in each ray path, however, the dispersion cancels out. In the Michaelson interferometer the second compensation plate having a thickness equal to the beamsplitter plate must be used; in this embodiment the compensation is automatic since the ray passes through a different portion of the same optical plate.

Figure 4:
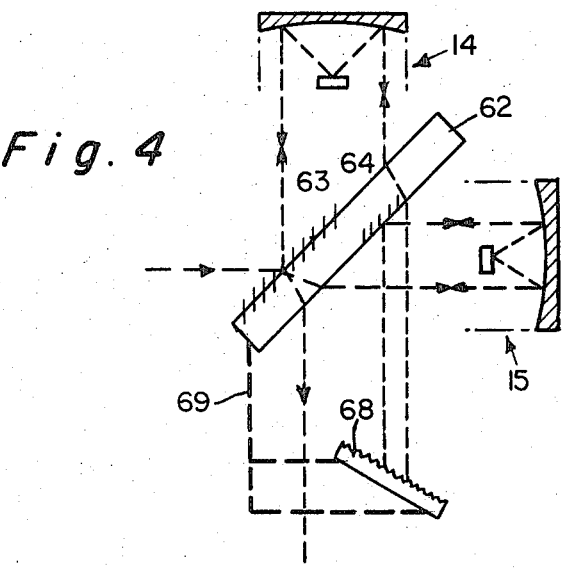
FIG. 4 is a schematic diagram illustrating the use of a diffraction grating with the present invention to select wavelengths of interest.

FIG. 4 shows a variant of the second embodiment in which a diffraction grating 68 is substituted for the single mirror employed to return both of the split beams. Mechanical means represented by dotted lines 69 employed to position the diffraction grating can be made adjustable to select wavelengths of interest. As the angle of the diffraction grating is varied with respect to the flat plate beamsplitter 62, the path length difference will be varied, but once the wavelength of interest has been selected, this difference in path length can be corrected by moving one of the retroreflectors with respect to the beamsplitter.

Although particular embodiments of the invention have been described and illustrated herein, it is recognized that modifications and equivalents may readily occur to those skilled in the art and consequently it is intended that the claims be interpreted to cover such modifications and equivalents.

What is claimed is:

1. In an interference spectrometer of the double-pass type having a light detector for detecting interference fringes produced by recombined light passing through different optical paths from a single source,
    means for producing a coherent reference beam,
    a plane having a semi-reflecting beamsplitting surface area oriented to split said beam into two coherent component beams, a first split beam being transmitted through said beamsplitting surface area in a direction parallel to said reference beam and the second split beam being reflected by said beamsplitting surface area in a direction normal to the direction of said first split beam,
    planar means for reflecting a beam,
    a first retroreflecting means for redirecting said first split beam through said beamsplitting plane at a position outside of said beamsplitting surface area and onto said planar means for reflection back through substantially the same path to said beamsplitting surface,
    means for detecting light reflected by said first retroreflecting means through said beamsplitting surface,
    a plane having a beam reflecting surface area parallel to said semi-reflecting beamsplitting surface area, and
    a second retroreflecting means for redirecting said second split beam onto said beam reflecting surface area parallel to said semi-reflecting beamsplitting surface area for reflection onto said planar reflecting means along a path parallel to the bath of said first split beam reflected by said first retroreflecting means onto said planar reflecting means for reflection back through said second retroreflecting means and said semi-reflecting beamsplitting surface area for interference with said first split beam, thereby causing said detecting means to produce a signal which varies in amplitude as the extent of interference varies as a function of optical path length difference of said split beams.

2. The combination of claim 1 wherein said semi-reflecting beamsplitting surface area is on a hypotenuse side of an isosceles right-angle prism, said planar means for reflecting a beam is on a surface of said prism at an angle sufficiently close to 45° with respect to said semi-reflecting beamsplitting surface area to keep said split beams reflected therefrom within the field of view of said retroreflecting means for return to said semi-reflecting beamsplitting surface area, and said beam reflecting surface area parallel to said semi-reflecting beamsplitting surface area is on said hypotenuse side of said right-angle prism.

3. The combination of claim 2 wherein said semi-reflecting beamsplitting surface area is adjacent one other side of said prism and said beam reflecting surface area is adjacent the third side of said prism, where said one other side and said third side are sides of said prism meeting said hypotenuse side at substantially 45°, and said surface of said planar reflecting means is on said one other side of said prism.

4. The combination of claim 3 wherein each of said first and second retroreflecting means redirects an incoming split beam along an outgoing path parallel to and displaced from the path of the incoming split beam, each of said retroreflecting means having an optical axis centered between parallel incoming and outgoing beam paths, and wherein said optical axes intersect at a point on one side of said hypotenuse side of said right-angle prism such that an incoming split beam is returned by one retroreflecting means at a distance from said optical axis thereof which is different than the corresponding distance of a return path from said optical axes of the other retroreflecting means, whereby one of said split beams is transmitted through said hypotenuse side of said right-angle prism without interference by said surface area on said hypotenuse side provided for reflecting the other split beam onto said planar means for reflecting a beam.

5. The combination of claim 4 including a second right-angle prism having its hypotenuse side against said hypotenuse side on which said beamsplitting surface is provided to form a cube.

6. The combination of claim 1 wherein said semi-reflecting beamsplitting surface area is on one of two parallel sides of a transparent plate and said beam reflecting surface area parallel to said semi-reflecting beamsplitting surface area is on the other of said two parallel sides of said plate, and said planar means for reflecting a beam is on a surface of a separate plate at an angle sufficiently close to 45° with respect to said semi-reflecting beamsplitting surface area to keep said split beams reflected therefrom within the field of view of said retroreflecting means.

7. The combination of claim 6 wherein each of said first and second retroreflecting means redirects an incoming split beam along an outgoing path parallel to and displaced from the path of the incoming split beam, each of said retroreflecting means having an optical axis centered between parallel incoming and outgoing beam paths, and wherein said optical axes intersect at a point on one side of said beamsplitting side of said transparent plate, whereby one of said split beams is transmitted through said transparent plate without interference by said beam reflecting surface area parallel to said semi-reflecting beamsplitting surface area.

8. The combination of claim 7 wherein an incoming split beam is returned by one retroreflecting means at a distance from said optical axis thereof which is equal to the corresponding distance of a return path from said optical axis of the other retroreflecting means.

9. The combination of claim 7 wherein said optical axes intersect at a distance $h$ on one side of the surface of said parallel plate having said semi-reflecting beamsplitting surface area, said distance being measured from said surface having said semi-reflecting beamsplitting surface area along a line parallel to said reference beam, and said distance $h$ is given by the equation $$h = \sqrt{2}\, t/2 \ \sqrt{2N^2 - 1}$$

where $N$ is the index of refraction of said transparent plate and $t$ is the thickness of said transparent plate.

10. The combination of claim 7 wherein said planar means for reflecting a beam is a diffraction grating.

11. The combination of claim 1 including a lead screw connected to one of said retroreflecting means to move said means along a path parallel to a path of one split beam from said beamsplitting surface area, and a motor for driving said lead screw to achieve large, low-frequency changes in optical path length difference between said one split beam and the other split beam, and a moving-coil actuator connected to the other of said retroreflecting means to move said means along a path parallel to a path of the other split beam from said beamsplitting surface area to achieve smaller changes in optical path length difference at higher frequencies than changes in optical path length difference achieved through said lead screw.

12. The combination of claim 11 wherein each retroreflector includes, a primary mirror, a secondary mirror having a mass which is smaller than the mass of said primary mirror, means for holding said secondary mirror in opposed relationship to said primary mirror, including a transducer for supporting said secondary mirror and moving it relative to said primary mirror, and including means for energizing said transducer of said one retroreflecting means with an input signal of stable high frequency to modulate said optical path length difference, thereby modulating said signal produced by said light detecting means, means for synchronously demodulating said signal to produce a demodulated output signal, means for coupling low-frequency components of said demodulated output signal to said moving-coil actuator, and means for coupling high-frequency components of said demodulated output signal to said transducer of said retroreflecting means positioned by said moving-coil actuator.

13. In a drive system for establishing optical path length difference in a double-pass interferometer of a type which includes two retroreflectors, each having a large mass primary mirror and a samll mass secondary mirror, said secondary mirror being mounted in a housing for said primary mirror on a piezoelectric transducer for small amplitude motion relative to said primary mirror at high frequency, said interferometer including means for splitting an incoming beam into two beams, one directed into one retroreflector and the other directed into the other retroreflector, and reflecting means for returning the split beams through their respective retroreflectors, a lead screw connected to one of said retroreflectors to move said one retroreflector along a path parallel to a split beam directed into said one retroreflector, a motor for driving said lead screw to achieve large low-frequency changes in optical path length difference between said split beams, a moving-coil actuator connected to the other of said retroreflectors to move said other retroreflector along a path parallel to a split beam directed into said retroreflector to achieve smaller changes in optical path length difference at higher frequencies than through said lead screw, means for energizing said transducer of said one retroreflector with an input signal of stable high frequency to modulate said optical path length difference, means for producing an output signal proportional to said optical path length difference, means for synchronously demodulating said output signal to produce a demodulated output signal, means for coupling low-frequency components of said demodulating output signal to said moving-coil actuator, and means for coupling high-frequency components of said demodulated output signal to said transducer of said other retroreflector positioned by said moving-coil actuator.

* * * * *